(12) United States Patent
Brannon

(10) Patent No.: US 7,007,790 B2
(45) Date of Patent: Mar. 7, 2006

(54) LOADING PLATFORM WITH TWIN ROLLER CONVEYORS

(76) Inventor: James D. Brannon, 119 Wilborn Cir., Simpsonville, SC (US) 29681

( * ) Notice: Subject to any disclaimer, the term of this patent is extended or adjusted under 35 U.S.C. 154(b) by 197 days.

(21) Appl. No.: 10/840,050

(22) Filed: May 6, 2004

(65) Prior Publication Data

US 2005/0247540 A1    Nov. 10, 2005

(51) Int. Cl.
    *B65G 47/00*    (2006.01)
(52) U.S. Cl. .................. 198/346; 198/193; 198/35 R
(58) Field of Classification Search ............ 198/346, 198/836.1; 193/35 R; 414/573, 662, 607, 414/663
    See application file for complete search history.

(56) References Cited

U.S. PATENT DOCUMENTS

| | | | |
|---|---|---|---|
| 1,818,289 A | 8/1931 | White ..................... 414/787 |
| 3,514,011 A | 5/1970 | De Meritt et al. ......... 414/607 |
| 3,586,142 A * | 6/1971 | Inwood et al. ............ 193/35 R |
| 3,720,329 A | 3/1973 | Gamble .................... 414/531 |
| 3,861,546 A | 1/1975 | Montgomery .............. 414/621 |
| 3,876,099 A * | 4/1975 | Land ....................... 414/608 |
| 3,955,342 A * | 5/1976 | Johnson et al. ........... 53/377.2 |
| 4,278,395 A | 7/1981 | Thunell ..................... 414/786 |
| 4,355,940 A * | 10/1982 | Derickson ................. 414/439 |
| 4,756,659 A * | 7/1988 | Bader ....................... 414/502 |
| 4,765,493 A * | 8/1988 | Kinney ..................... 211/59.2 |
| 4,832,185 A * | 5/1989 | Huber ....................... 198/788 |
| 4,881,866 A | 11/1989 | Harmon ..................... 414/607 |
| 5,088,752 A * | 2/1992 | Henderson et al. ........ 280/79.11 |
| 5,110,153 A * | 5/1992 | Kallansrude et al. ....... 180/41 |
| 5,325,953 A * | 7/1994 | Doster et al. ............. 198/304 |
| 5,411,360 A | 5/1995 | Helliker et al. ........... 414/608 |
| 5,887,732 A * | 3/1999 | Zimmer et al. ........... 211/59.2 |
| 6,089,385 A * | 7/2000 | Nozawa .................... 211/59.2 |
| 6,138,812 A * | 10/2000 | Kimener ................... 193/35 G |
| 6,206,628 B1 | 3/2001 | McDermott ............... 414/607 |
| 6,746,181 B1 * | 6/2004 | Heintz et al. ............. 405/219 |
| 6,789,997 B1 * | 9/2004 | Coblentz .................. 414/803 |
| 6,799,933 B1 * | 10/2004 | Wasinger et al. ......... 414/352 |

* cited by examiner

Primary Examiner—Douglas Hess

(57) ABSTRACT

A load transfer platform adapted for attachment to a lift has a pair of laterally extending roller conveyor which are space in a front to rear direction thereby providing a pathway there between for a workman loading and unloading merchandise.

4 Claims, 2 Drawing Sheets

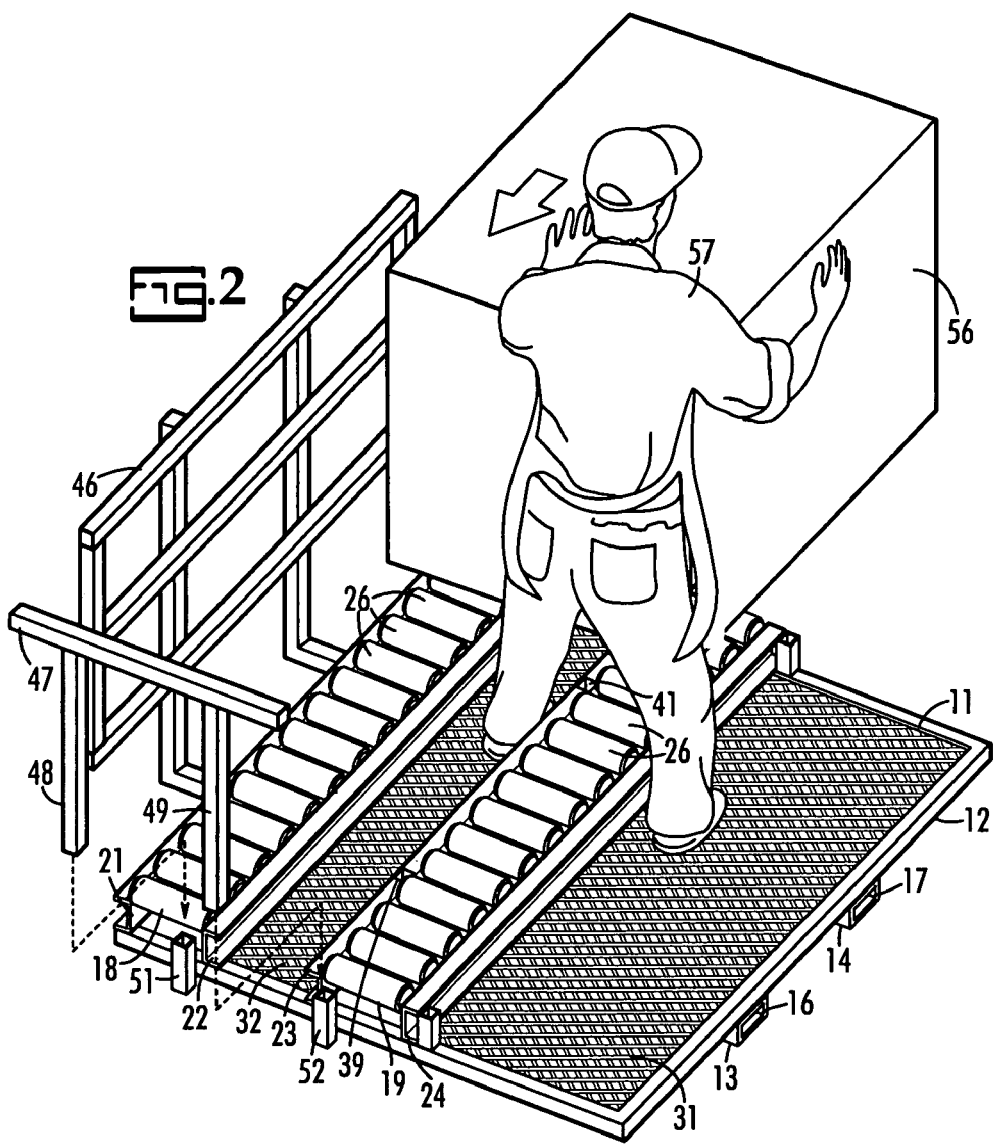
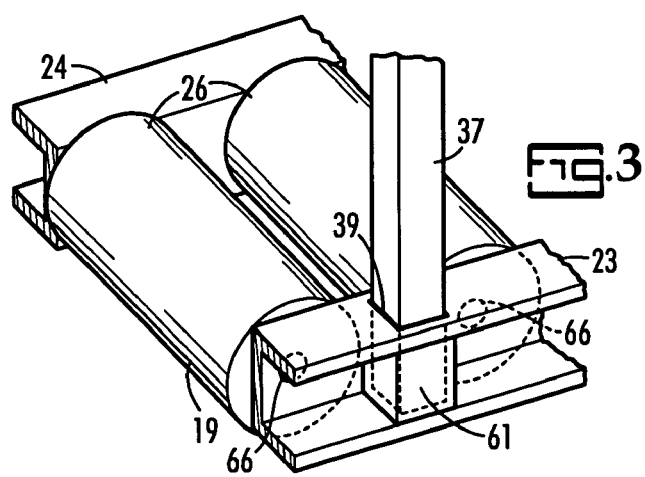

LOADING PLATFORM WITH TWIN ROLLER CONVEYORS

RELATED APPLICATIONS

This invention is an improvement of the loading platform disclosed in the inventor's U.S. patent application Ser. No. 10/607,700 filed Jun. 27, 2003 for a Loading Platform Assembly for which benefit under 35 U.S.C. 120 is claimed.

BACKGROUND OF THE INVENTION

Warehouse type home improvement and builders supply stores use order picker lift trucks to move bulky merchandise between storage, point of display and customer loading. The hereinbefore identified loading platform assembly is a lift truck attachment designed to quickly and safely provide transport for wide entryway or patio door modules and large crates or appliances. When moving large boxes or crates onto or off of the roller conveyor, the workman must stand at one side of or at the end of the roller conveyor and these positions are awkward and not the most effective for applying force to move the merchandise on to or off of the roller conveyor. Since the roller braking mechanism is released during loading and unloading, it would be dangerous to stand on the roller conveyor during loading or unloading operations in attempting to gain a force applying advantage relative to the conveyed merchandise.

BRIEF DESCRIPTION OF THE INVENTION

The improved loading platform uses two parallel roller conveyors with a walkway there between. This permits the workman to place at least one foot on the walkway separating the conveyors when pushing a container or appliance off the loading platform or when placing such item onto the loading platform. Thus the workman can apply effective cargo moving force from a correct force applying position. This attachment reduces worker fatigue and injury potential and also increases efficiency through reduction of time required to load and unload merchandise. The improved loading platform places the sockets for the legs of an upright brace in a side support beam for one of the roller conveyors so as to not obstruct the walkway between the roller conveyors.

BRIEF DESCRIPTION OF THE DRAWINGS

One embodiment of the invention is shown in the drawings in which:

FIG. 2 shows the loading platform being used to transport a boxed appliance and

FIG. 3 is a vertical section of a brace socket built into a roller support beam.

DETAILED DESCRIPTION OF THE INVENTION

Figure 1:
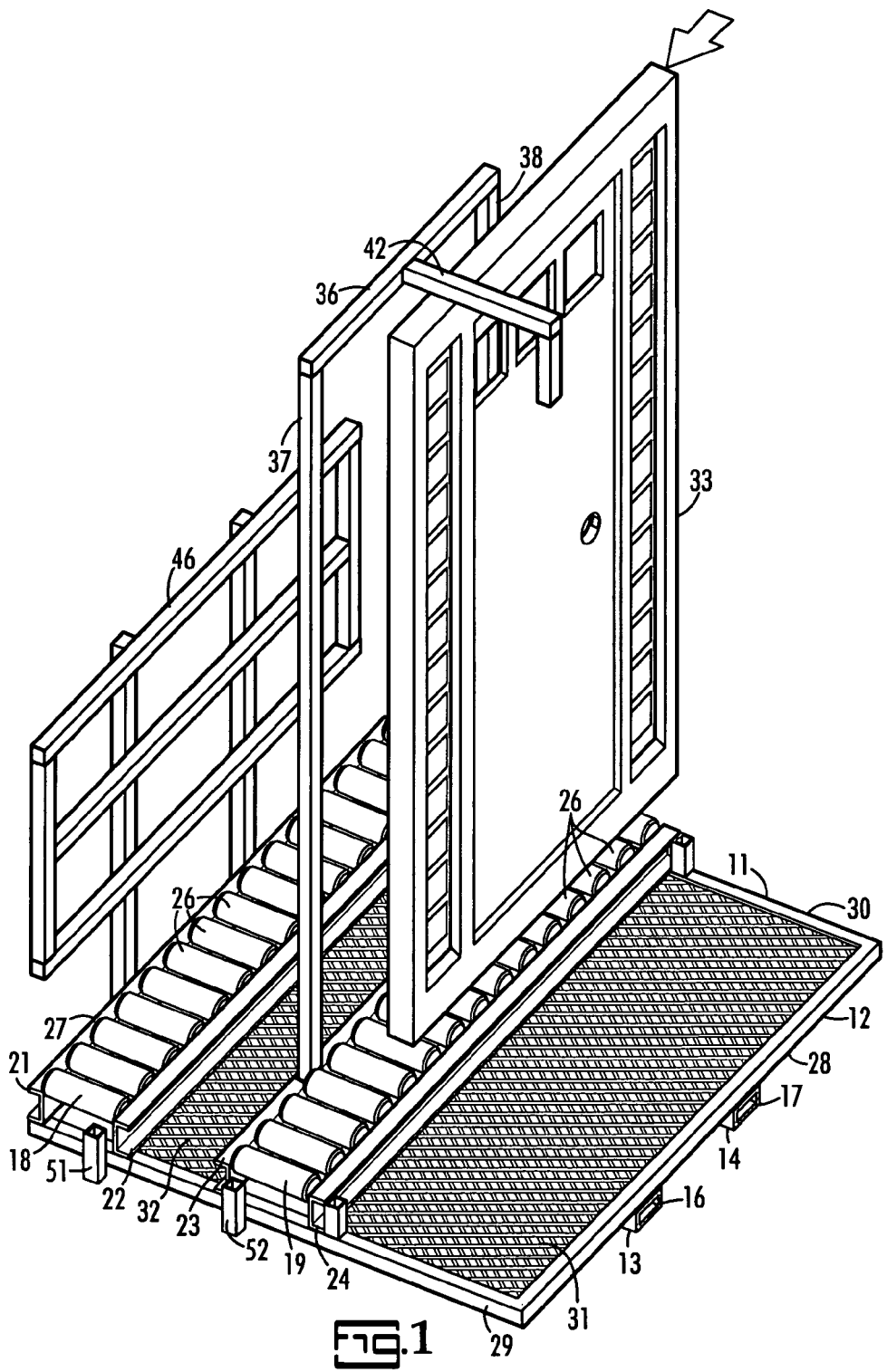
FIG. 1 shows the loading platform being used to transport a patio door unit.

FIG. 1 illustrates a lift truck attachment in the form of a load transfer platform 11 which includes a horizontally disposed deck 12 having a pair of parallel laterally spaced hollow frame members 13, 14 extending front to rear on its underside and presenting end openings 16, 17 adapted to receive a pair of laterally spaced forks of an order picker lift truck, not shown, or other material handling vehicle. A pair of parallel horizontal and roller conveyors 18, 19, spaced from one another in a front to rear direction of the attachment are mounted on the top side of the deck 12 by parallel roller support beams 21, 22, 23, 24 which rotatably support the shafts 66 of the cylindrical rollers 26, as shown in FIG. 3. The deck 12 has a front side 27, a rear side 28 and a laterally opposite sides 29, 30. The deck 12 includes a floor segment 31 at the backside of the roller conveyor 19 and a floor segment 32 between the roller conveyors 18, 19. The fore and aft extending hollow frame members 16, 17 reinforce the deck 12 by being secured to its underside and the roller support beams 21, 22, 23, 24 reinforce the deck 12 by being secured to its top side. Thus the deck 12 is reinforced in a fore and aft direction and laterally. Tall flat items such as the illustrated entrance door module 33 are placed on the roller conveyor 19 and leaned against an upright support brace 36 whose legs 37, 38 are mounted in sockets 39, 41 formed in the roller support beam 23, which are shown in greater detail in FIG. 3. The brace 36 includes a hook segment 42 at its top for stabilizing tall items. A front guardrail 46 is provided at the front of the attachment 11 and sockets 51, 52 are shown at one side of the deck 12 for receiving legs 48, 49 of a side brace 47 shown in FIG. 2.

FIG. 2 shows the loading platform assembly 11 adjusted for transport of a boxed appliance 56. The upright brace 36 shown in FIG. 1 has been removed in FIG. 2 and the side guard 47 is shown detached from its sockets 51, 52. The floor segment 32 between the roller conveyors 19, 21 forms a pathway which permits the workman 57 to place one foot on one side of the conveyor 19 and the other foot on the other side of the conveyor 19. This positions the workman 57 in better position to efficiently apply force to the boxed appliance 56 when moving it onto or off of the loading platform 11. The roller support beams 21, 22, 23, 24 position the rollers 26 above the deck floor segments 31, 32 thereby reducing the likelihood of a worker accidentally stepping on the rollers 26. It should be understood that a releasable brake mechanism, like that shown in my hereinbefore identified U.S. patent application Ser. No. 10/607,700, is provided to, brake the rollers 26 of the conveyors 18, 19 while the merchandise is being transported.

As shown in FIG. 3 the socket 39 for the leg 37 of the brace 36 includes a U shaped segment 61 welded to the channel shaped beam 23. The socket 39 and the socket 41 are positioned laterally between the shafts 66 of adjacent rollers 26 which are supported by the webs of the channel shaped beams 23, 24.

The illustrated lift truck attachment provides an improved safe loading platform which is particularly useful in handling merchandise in a builders or homeowners supply store of the warehouse type where merchandise is stocked in racks and also displayed at floor level.

What is claimed is:

1. A load transfer platform adapted for connection to a pair of laterally spaced forks of a lift mechanism of a material handling vehicle, comprising:
    a horizontally disposed deck having front, rear and laterally opposite sides and including
        a pair of parallel hollow frame members secured to the underside of said deck adapted to receive said laterally spaced forks,
        a pair of horizontal and parallel roller conveyors on the top side of said deck extending between said laterally opposite sides and spaced from one another in a front to rear direction, each of said conveyors including a pair of laterally extending parallel roller support beams secured to said ton side of said deck,
        a first work floor segment between said roller conveyors extending between said laterally opposite sides of said deck providing a foot path for a workman, and a second work floor segment extending between said laterally opposite sides of said deck between the rear side of said deck and the roller conveyor closest to said rear side, said roller support beams being disposed above the elevation of said floor segments.

2. The load transfer platform of claim 1 wherein one of said roller conveyors is adjacent said front side of said deck.

3. The load transfer platform of claim 1 wherein each of said roller conveyors include cylindrical rollers supported by said beams and further comprising a tall upright brace having a pair of legs and a pair of sockets adapted to receive said legs of said upright brace, said sockets being formed in one of said beams.

4. The load transfer platform of claim 1 wherein each of said roller conveyors has a plurality of cylindrical rollers rotatably supported by its associated beams.

* * * * *